United States Patent
Kulkarni et al.

(10) Patent No.: US 11,410,081 B2
(45) Date of Patent: Aug. 9, 2022

(54) MACHINE LEARNING WITH DIFFERENTLY MASKED DATA IN SECURE MULTI-PARTY COMPUTING

(71) Applicant: International Business Machines Corporation, Armonk, NY (US)

(72) Inventors: Vaibhav Murlidhar Kulkarni, Bangalore (IN); Rakhi S. Arora, Bangalore (IN); Padmanabhan Krishnan, Bangalore (IN); Gopikrishnan Varadarajulu, Bangalore (IN)

(73) Assignee: INTERNATIONAL BUSINESS MACHINES CORPORATION, Amonk, NY (US)

( * ) Notice: Subject to any disclaimer, the term of this patent is extended or adjusted under 35 U.S.C. 154(b) by 499 days.

(21) Appl. No.: 16/416,412

(22) Filed: May 20, 2019

(65) Prior Publication Data

US 2020/0372394 A1 Nov. 26, 2020

(51) Int. Cl.
*G06N 20/00* (2019.01)
*G06N 5/02* (2006.01)
*H04L 9/08* (2006.01)

(52) U.S. Cl.
CPC .............. *G06N 20/00* (2019.01); *G06N 5/02* (2013.01); *H04L 9/085* (2013.01); *H04L 2209/46* (2013.01)

(58) Field of Classification Search
CPC .......... G06N 20/00; G06N 5/02; H04L 9/085; H04L 2209/46; G06F 21/6245
See application file for complete search history.

(56) References Cited

U.S. PATENT DOCUMENTS 10,198,399 B1 *  2/2019  Fritchman ............. G06F 21/602
10,635,824 B1 *  4/2020  Triandopoulos .... G06F 21/6245
(Continued)

FOREIGN PATENT DOCUMENTS

| WO | 2017171726 A1 | 10/2017 |
| WO | 2018174873 A1 | 9/2018 |
| WO | 2019046651 A1 | 3/2019 |

OTHER PUBLICATIONS

H.H.M. Campmans, Optimizing Convolutional Neural Networks in Multi-Party Computation, Master Thesis, Eindhoven University of Technology (Year: 2018).*

*Primary Examiner* — Shanto Abedin
(74) *Attorney, Agent, or Firm* — Garg Law Firm, PLLC; Rakesh Garg; Christopher Pignato (57) ABSTRACT

In a secure multi-party computation (sMPC) system, a super mask is constructed using a set of masks corresponding to a set of data contributors. Each data contributor uses a corresponding different mask to obfuscate the data of the data contributor. a first scaled masked data is formed by applying a first scale factor to first masked data of the first data contributor, the scale factor being computed specifically for the first data contributor from the super mask. A union is constructed of all scaled masked data from all data contributors, including the first scaled masked data. A machine learning (ML) model is trained using the union as training data, where the union continues to keep obfuscated the differently masked data from the different data contributors. The training produces a trained ML model usable in the sMPC with the set of data contributors.

11 Claims, 5 Drawing Sheets

(56) References Cited

U.S. PATENT DOCUMENTS

| | | | |
|---|---|---|---|
| 2017/0173262 A1* | 6/2017 | Veltz | G16H 20/17 |
| 2019/0386827 A1* | 12/2019 | Stanley | H04L 9/14 |
| 2020/0242466 A1* | 7/2020 | Mohassel | G06F 21/6254 |
| 2020/0293941 A1* | 9/2020 | Bos | H04L 9/0869 |
| 2020/0304293 A1* | 9/2020 | Gama | G06N 3/08 |
| 2020/0327250 A1* | 10/2020 | Wang | G06F 21/6218 |
| 2020/0366459 A1* | 11/2020 | Nandakumar | G06N 3/084 |
| 2021/0167946 A1* | 6/2021 | Bitan | H04L 9/0894 |

* cited by examiner

MACHINE LEARNING WITH DIFFERENTLY MASKED DATA IN SECURE MULTI-PARTY COMPUTING

TECHNICAL FIELD

The present invention relates generally to a method, system, and computer program product for performing machine learning model training and making predictions using trained machine learning model. More particularly, the present invention relates to a method, system, and computer program product for machine learning with differently masked data in secure multi-party computing.

BACKGROUND

Machine learning (ML) is a method of data analysis where a data analysis algorithm or method (model) is trained on a given set of data (training data). The training involves identification of patterns and extraction of an intrinsic characteristic of the data, and configuring the model to make automated decisions based on the training data. The model is said to be trained when the model is able to make the desired decisions based on the training data.

A trained model is expected to make similar decisions when new data conforming to certain characteristics of the training data is input into the trained model. One example of decision-making by trained models is data forecasting or prediction of a future condition. For example, suppose a model is provided with meteorological data of a geographical area as input and is trained to output the corresponding weather conditions in the geographical area as the decision. The trained model is later expected to make weather forecasts for the geographical area given new meteorological data from the geographical area. Other ML based models can similarly be trained to make predictions in other fields, or make other types of decisions with minimal human intervention.

As can be seen, ML requires training data. The quality of the training, and correspondingly, the quality or even the model's ability to make any decisions at all depends on the quality and completeness of the training data. The more complete the training data, the better the training, and correspondingly better the decisions of the trained model.

Multi-party computing is a field of endeavor where different data contributors collaborate to perform some type of computing exercise. For example, various financial institutions might supply their respective data to create creditor profiles in a multi-party computing effort. While such collaboration is generally beneficial to the various parties involved, a number of reasons exist for which the data contributors might prefer to keep their respective data secure and undisclosed from other data contributors in the multi-party computing exercise. For example, one data contributor might be a competitor bank of another data contributor bank but the two banks might still want to collaborate in a multi-party computing exercise to create creditor profiles.

A data contributor applies certain security measures to the data contributor's data to keep their data secure and undisclosed to other parties in a multi-party computing exercise. One such security measure is data masking or obfuscating data using a mask. Data masking is the process of applying a mask to some or all of the data provided by a data contributor. A mask is a value, e.g., a numeric value. Applying a mask to a data item is the process of subjecting the data item and the mask to a function such that the function transforms the data item according to the mask and the operations implemented in the function.

As an example, a function might be an addition operation where the mask value is added to the data item value to produce a sum of the data item and the mask value as the transformed data item. As another example, a function might be a subtraction operation where the mask value is subtracted from the data item value to produce a difference of the data item and the mask value as the transformed data item. As another example, a function might be a multiplication operation where the mask value is multiplied with the data item value to create a multiplication product of the data item and the mask value as the transformed data item. As another example, a function might be a division operation where the data item value mask value is divided by the mask value to create a quotient as the transformed data item. Many other functions with more complex operations are similarly possible and contemplated within the scope of the illustrative embodiments.

SUMMARY

The illustrative embodiments provide a method, system, and computer program product. An embodiment includes a method that constructs, in a secure multi-party computation (sMPC) system, a super mask using a set of masks corresponding to a set of data contributors, wherein each data contributor in the set of data contributors uses a corresponding different mask from the set of masks to obfuscate the data of the data contributor. The embodiment applies, using a processor and a memory, to form a first scaled masked data, a first scale factor to first masked data of the first data contributor, the scale factor being computed specifically for the first data contributor from the super mask. The embodiment constructs a union of all scaled masked data from all data contributors in the set of data contributors, the union including the first scaled masked data of the first data contributor. The embodiment trains a machine learning (ML) model using the union as training data, wherein the union continues to keep obfuscated differently masked data from different data contributors, the training resulting in a trained ML model usable in the sMPC with the set of data contributors.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Thus, secure multi-party computation (SMPC) is a field in which different parties (often non-trusting) come together to jointly compute a function over their inputs while keeping their inputs private. SMPC has been used for analysis and generating insights into commercial scenarios, but so far there are no practical ways of executing machine learning models in sMPC mainly because there is no good method of training a ML model or predicting based on a ML model with masked data.

In a typical sMPC environment, 'data contributors' or 'participants' share masked private data. a 'broker' or 'service provider' provides the hardware and software infrastructure for executing the computation. An 'analyst' is someone who derives insights or generates reports on this masked private data.

Data Contributors usually mask their input data with a random mask value which is generally added or multiplied to the input data and shared with broker. A data contributor encrypts the random masks with public key shared by analyst. The data contributor shares the encrypted random mask with analyst. So, neither the analyst nor the broker can unmask the data and get real user data, unless they collude with each other. Once all data contributors share their masked data with the broker, the broker aggregates data from all data contributors and shares the aggregate masked data with analyst. The analyst decrypts all the random masks received from data contributors and aggregates to get an aggregated mask value. The analyst then can apply a reverse function with the aggregated mask value on the aggregated masked data shared by the broker. For example, if the masking was done with an addition operation, the reverse function would apply subtraction—the opposite of addition—to the aggregated masked data. Similarly, if the masking was done with a multiplication operation, the reverse function would apply division—the opposite of multiplication—to the aggregated masked data.

With this reverse function, the analyst can compute aggregate of all data values shared by data contributor without having access to individual private data. However, the illustrative embodiments recognize that with this presently used approach to sMPC, training an ML model or using a trained ML model for predictions is not possible.

ML and sMPC are well recognized technological fields of endeavor. The present state of the technology in the sMPC field of endeavor has certain drawbacks and limitations as relates to ML. The operations and/or configurations of the illustrative embodiments impart additional or new capabilities to improve the existing technology in the technological field of endeavor of sMPC, especially in the area of using ML models with masked data of sMPC.

The present state of the technological field of endeavor of sMPC presently does not include a mechanism to enable ML with differently masked data from different data contributors. A need exists for being able to apply ML models to masked data in sMPC scenarios to be able to make predictions for a particular data contributor in that data contributor's data when only masked data is available from that data contributor. A need exists that such ML model-based predictions be enabled for different data contributors who are participating in sMPC while using only their differently masked data and maintaining their data secrecy. A need exists that ML model be trainable with only differently masked data from different data contributors.

The illustrative embodiments recognize that the presently available tools or solutions do not address these needs/problems or provide adequate solutions for these needs/problems. The illustrative embodiments used to describe the invention generally address and solve the above-described problems and other related problems by machine learning with differently masked data in secure multi-party computing.

An embodiment can be implemented as a combination of certain hardware components and a software application. An implementation of an embodiment, or one or more components thereof, can be configured as a modification of an existing sMPC broker-analyst configuration, with a companion software application executing in some combination of (i) the broker system and/or the analyst system, (ii) a data processing system communicating with the broker system and/or the analyst system over short-range radio or a local area network (LAN), and (iii) a data processing system communicating with the broker system and/or the analyst system over a wide area network (WAN).

Any operation described herein as occurring at or performed by a particular node, e.g., a broker node or an analyst node, can be implemented in such a manner that one node-specific function causes an operation to occur or be performed at the other node. Therefore, any recitation of a node performing an operation should not be construed as a node-specific limitation on the illustrative embodiments.

For the purposes of the clarity of the description, and not to imply a limitation on the illustrative embodiments, the illustrative embodiments are described using a specific method of applying a mask, i.e., by multiplying a mask value with a data value. Other methods of applying the mask, as described herein, are contemplated within the scope of the illustrative embodiments. For example, an implementation using a division or exponent method of applying a mask is contemplated within the scope of the illustrative embodiments.

Assume a sMPC use case with three data contributors D1, D2, and D3. Each data contributor uses a random value viz. D1 uses mask value a, D2 uses mask value b, and D3 uses mask value c, for masking all or portions of their respective private data. D1, D2, and D3 send their respective masked data to an embodiment implemented and operating as a broker application. D1, D2, and D3 encrypt their respective mask values, to wit, a, b, and c, respectively, using a public key provided by an embodiment that is implemented and operating as an analyst application. D1, D2, and D3 send their encrypted mask values to the analyst application embodiment.

The analyst application embodiment decrypts each encrypted mask value using the analyst application embodiment's private key. From the decrypted mask values a, b, and c, the analyst application embodiment constructs a super mask. The analyst application embodiment can use the decrypted mask values in any function, such as foo(a, b, c), to create the super mask. One example non-limiting way to create a super mask may be to use a polynomial of degree 'n' constituting the mask values of participants, e.g. $(x*a-y*b+z*c)\hat{\ }n$ where x, y, z & n are random numbers, or pseudo-random numbers, generated by the analyst application embodiment.

Once the analyst application embodiment computes the super mask M, the analyst application embodiment uses the super mask M to compute multiplication factors for each data contributor. For example, the analyst application embodiment computes multiplication factor f1 for data contributor D1 where f1=M/a; multiplication factor f2 for data contributor D2 where f2=M/b; and multiplication factor f3 for data contributor D3 where f3=M/c. The analyst application embodiment sends the multiplication factors f1, f2, and f3 to the broker application embodiment.

In one embodiment, the broker application embodiment uses the multiplication factors to normalize all the masked data that is input by each data contributor. For example, the broker application embodiment normalizes the masked data of each data contributor using the multiplication factors as follows—multiply each data item in the data contributed by D1 with f1, multiply each data item in the data contributed by D2 with f2, and multiply each data item in the data contributed by D3 with f3. In this manner, all the data from all data contributors now has been normalized to have same mask value and the broker application embodiment can create a single dataset comprising a union of all data contributed by individual parties D1, D2, D3. A union of several data sets includes all the data from all the data sets.

Because the analyst application embodiment knows all the mask values, if this normalized data is sent from the broker application embodiment to the analyst application embodiment, the analyst application embodiment will be able to unmask the individual data contributor's data even if that data is received from the broker application embodiment in the union form. To prevent this gap in the security of the union data, one broker application embodiment performs a further operation. The broker application embodiment computes a broker application embodiment-specific transformation value 'e'. In one embodiment, e can be a random or pseudo-random value generated by the broker application embodiment. In another embodiment, the broker application embodiment computes e using a suitable function. The broker application embodiment transforms the super mask M by applying a function of e to M, to make it difficult for analyst application embodiment to unmask the data even with known mask values.

The broker application embodiment uses transformation value e to calculate a scale factor for each data contributor as follows—scale factor s1=f1/e for D1; scale factor s2=f2/e for D2; and scale factor s3=f3/e for D3.

In another embodiment, the broker application embodiment multiplies each party's data with the respective scale factors and does a union of all data. Now, the analyst application embodiment cannot as easily unmask the data because the analyst application embodiment does not know the transformation value 'e' generated by the broker application embodiment.

To summarize, all the data contributors share their masked data with the broker application embodiment and share the mask values in encrypted format with the analyst application embodiment. The analyst application embodiment generates the super mask M and generates a multiplication factor for each data contributor as described herein. The analyst application embodiment then shares these multiplication factors with broker application embodiment to apply them to the data shared by the corresponding data contributors. The broker application embodiment generates a transformation value 'e' and divides the multiplication factor by the random value to get a 'scale factor' for each data contributor. The broker application embodiment applies a corresponding scale factor to each data contributor's masked data and constructs a union of the scaled masked data.

In one embodiment, which is usable for training an ML model at the analyst application embodiment, the analyst application embodiment uses the union of the scaled masked data to train a selected model. The analyst application embodiment then sends the trained model to the broker application embodiment for storing at the broker application embodiment. The broker application embodiment can now use the trained ML model on new data from any of the participating data contributors D1, D2, or D3, to produce predictions for that data contributor. The trained ML model works to produce useful predictions so long as (i) the new data from that data contributor uses the same mask value in their new data (i.e., D1 continues to use mask value a for their new data, D2 continues to use mask value b for their new data, D3 continues to use mask value c for their new data, and so on), and (ii) the new data conforms to a characteristic of that data contributor's masked data that was used in the training (i.e., if masked meteorological data was used for training, the new data should be meteorological data and not data about car sales). Furthermore, the broker application embodiment and analyst application embodiment have to use the same super mask and data contributor-specific scaling factors as were used during the training.

Therefore, when the broker application embodiment computes the scaling factors of the various data contributors, the broker application embodiment stores the scale factor together with the identification of the corresponding data contributor so that the appropriate scale factor can be reused for the correct corresponding data contributor during the prediction phase.

suppose D1 supplies new masked data, compliant in the manner described herein, and requests a prediction. The broker application embodiment uses scale factor s1 to scale the masked new data of D1. The broker application embodiment inputs the scaled new masked data into the trained ML model. The trained ML model outputs a result value. The broker application embodiment divides the result value by the scale factor to produce the predicted value. The broker application embodiment sends the predicted value to D1. D1 divides the predicted value by their mask value 'a' to obtain the real prediction output of the model.

The manner of machine learning with differently masked data in secure multi-party computing described herein is unavailable in the presently available methods in the technological field of endeavor pertaining to ML with masked data in sMPC. A method of an embodiment described herein, when implemented to execute on a device or data processing system, comprises substantial advancement of the functionality of that device or data processing system in using ML in sMPC where the data of the various data contributors remains masked with their corresponding different masks.

The illustrative embodiments are described with respect to certain types of data, masks values, mask applying methods, operations, transformations, broker-specific location or analyst-specific location of embodiments, normalizations, scaling, functions, algorithms, equations, model configurations, locations of embodiments, additional data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
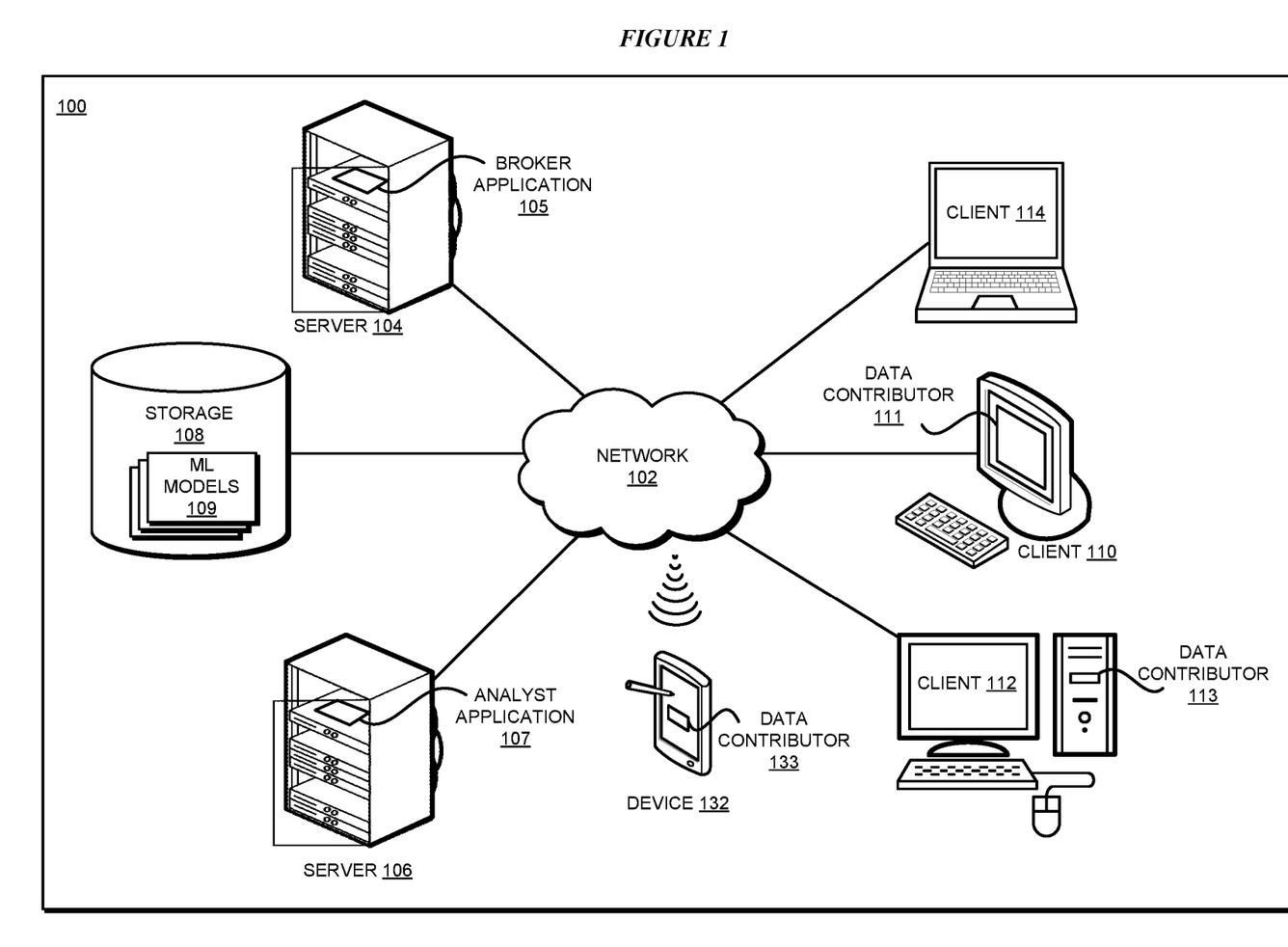
FIG. 1 depicts a block diagram of a network of data processing systems in which illustrative embodiments may be implemented.
Figure 2:
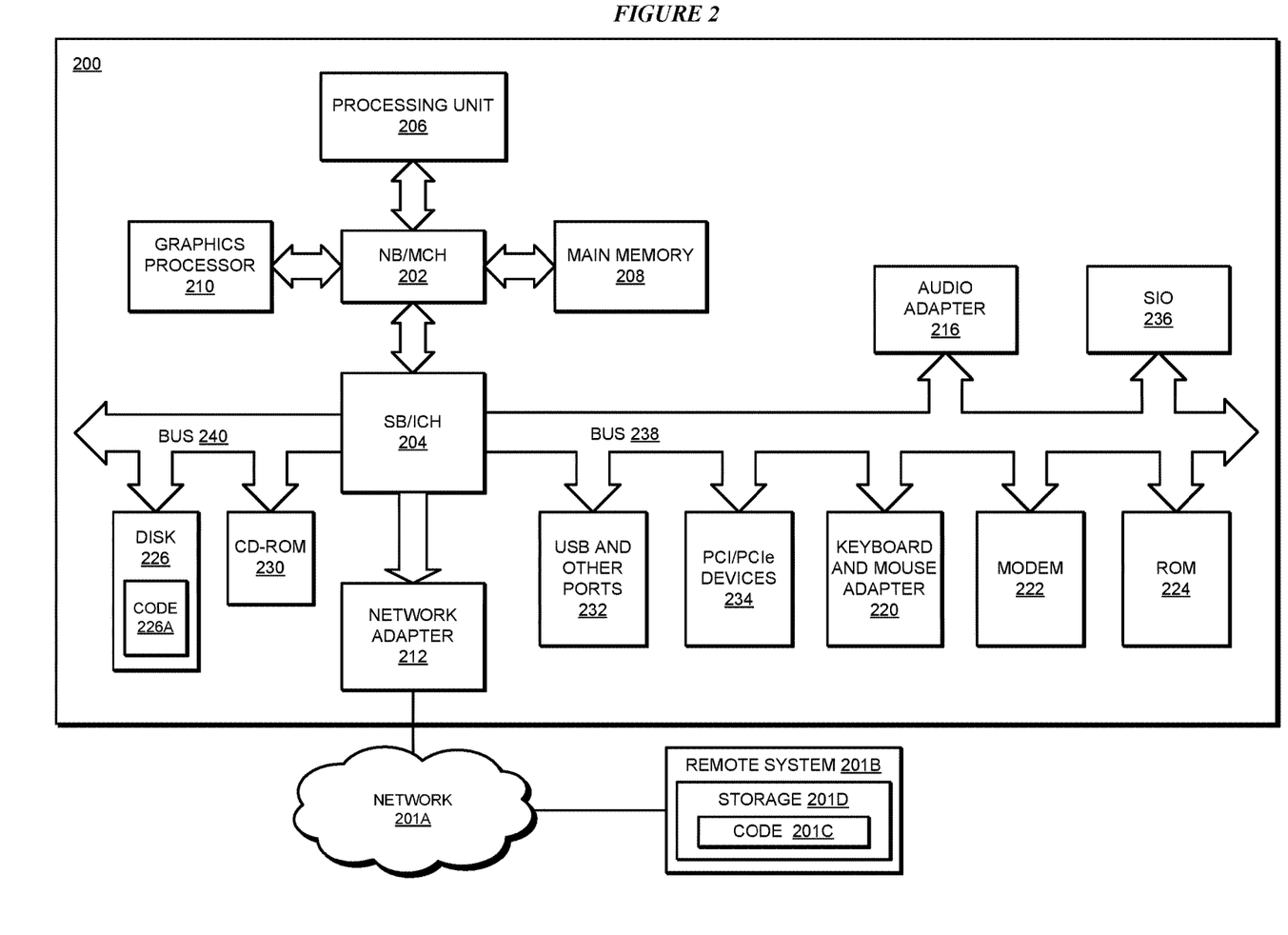
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements a broker application embodiment as described herein. Application 107 implements an analyst application embodiment as described herein. Storage unit 108 includes a library of ML models 109 from which analyst application embodiment 107 selects an ML model to train in a manner described herein. Data contributors 111, 113, and 133 are some examples of distinct data contributors as described herein.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN).

FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as applications 105 and 107 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations.

For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and hard disk drive 226 is manifested as a virtualized instance of all or some portion of hard disk drive 226 that may be available in the host data processing system. The host data processing system in such cases is represented by data processing system 200.

Figure 3:
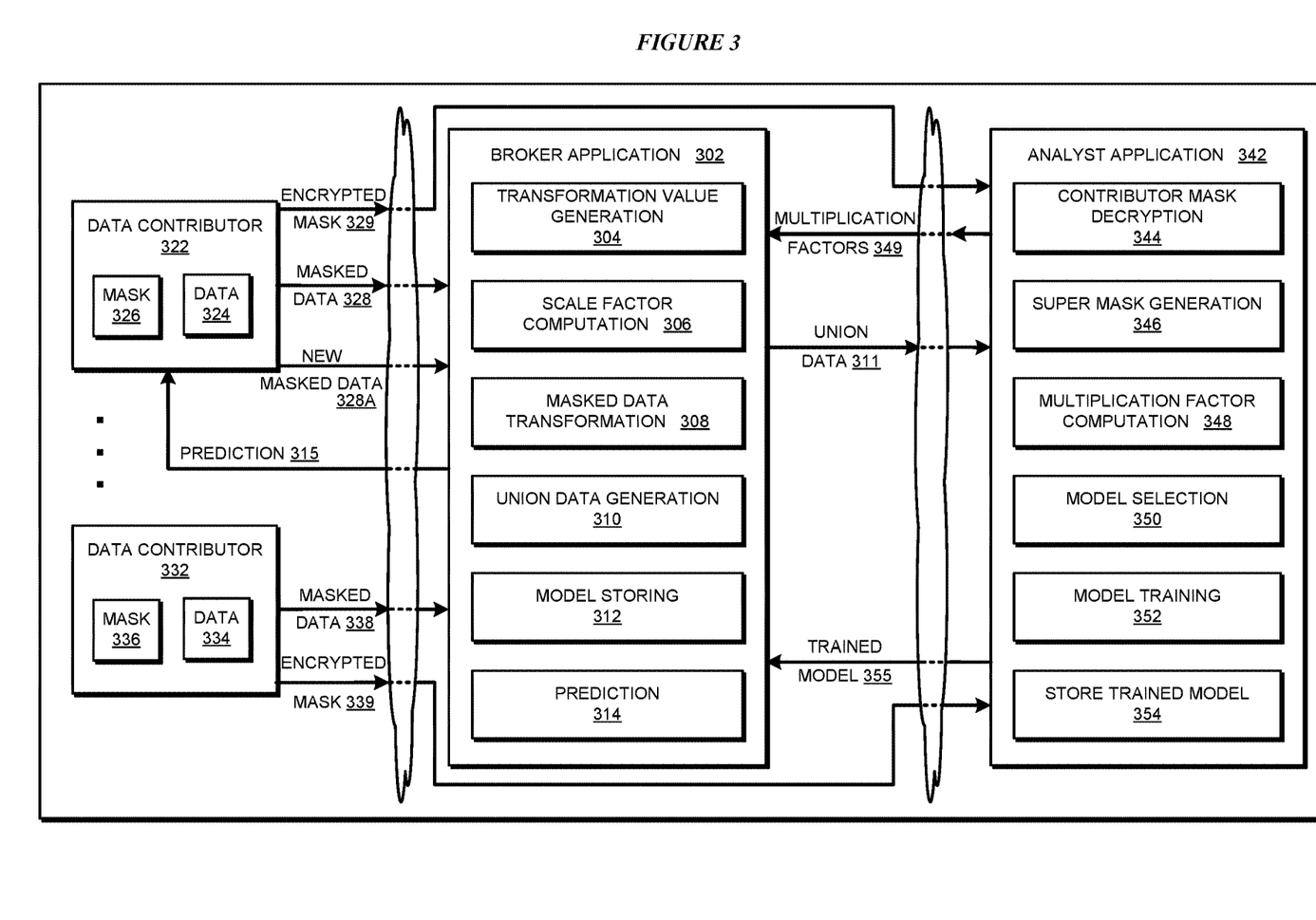
FIG. 3 depicts a block diagram of an example configuration for machine learning with differently masked data in secure multi-party computing in accordance with an illustrative embodiment.

With reference to FIG. 3, this figure depicts a block diagram of an example configuration for machine learning with differently masked data in secure multi-party computing in accordance with an illustrative embodiment. Application 302 is an example of application 105 in FIG. 1. Application 342 is an example of application 107 in FIG. 1. Data contributor 322 and 332 are example data contributor similar to data contributors 111, 113 and 133 depicted in FIG. 1. Any number of data contributors can be configured in the manner of data contributors 322 and 332.

Data contributor 322 provides data 324 for sMPC by masking all or parts of data 324 using mask 326, which produces masked data 328. Application 322 obtains masked data 328. Data contributor 322 encrypts mask 326 using application 342's public key and provides encrypted mask 329 to application 342.

Data contributor 332 provides data 334 for sMPC by masking all or parts of data 334 using mask 336 (e.g., a, b, c, . . . ), which produces masked data 338. Application 332 obtains masked data 338. Data contributor 332 encrypts mask 336 using application 342's public key and provides encrypted mask 339 to application 342.

Component 344 of application 342 decrypts each encrypted mask received, e.g., encrypted masks 329 and 339. Component 346 generates a super mask value (M) as described herein. Component 348 computes set 349 of multiplication factors, (e.g., f1, f2, f3, . . . ), which comprises a multiplication factor corresponding to each data contributor that supplied an encrypted mask. Application 342 provides set 349 of multiplication factors to application 302 (or application 302 obtains from application 342, or application 302 causes application 342 to transmit to application 302) set 349 of multiplication factors.

Component 304 of application 302 generates a transformation value (e). Component 306 uses the transformation value e and set 349 of multiplication factors to compute scale factors (s1, s2, s3, . . . ) in a manner described herein. Component 308 uses a scale factor (e.g., s1) corresponding to a data contributor (e.g., data contributor 322) to transform that data contributor's masked data.

Component 310 generates union data 311 from all the transformed masked data of all contributing data contributors (e.g., data contributor 322 and 332). Application 302 sends union data 311 to application 342.

Component 350 of application 342 selects a model from model library 109 in FIG. 1. Component 352 trains the selected model using union data 311. Component 354 stores trained model 355 at application 302 (or application 302 causes component 354 in application 342 to transmit trained model 355 to application 302, or application 302 receives trained model 355 from application 342). Component 312 at application 302 performs the storing of trained model 355 for later use at application 302.

Application 302 receives new masked data from a data contributor, e.g., new masked data 328A from data contributor 322. Application 302 scales new masked data 328A as described herein. Component 314 inputs the scaled new masked data into trained model 355 to produce an output. Component 314 postprocesses the output to produce prediction 315. Application 302 sends prediction 315 to data contributor 322. Data contributor 322 further postprocesses prediction 315 in a manner described herein to obtain the predicted value.

Figure 4:
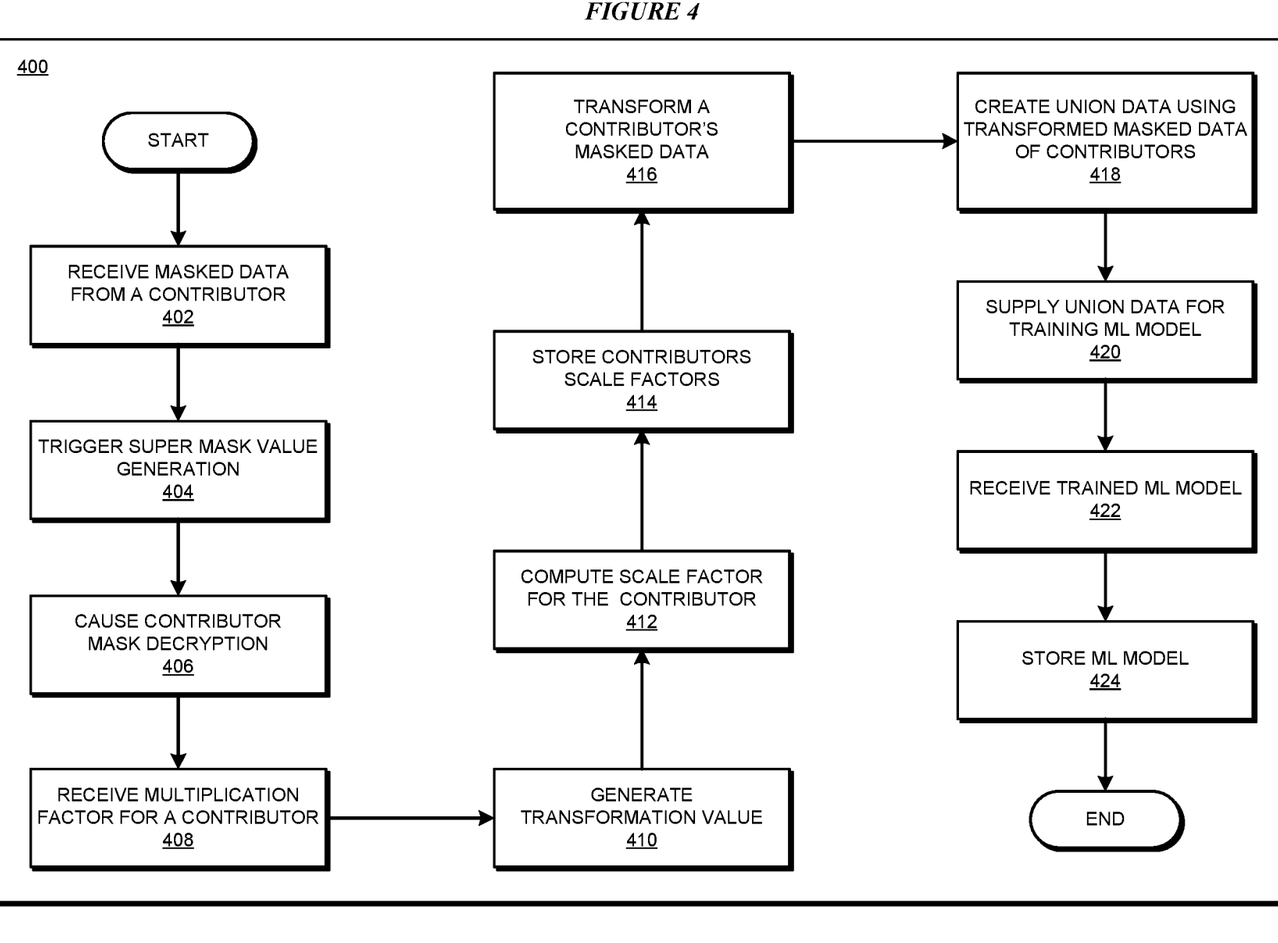
FIG. 4 depicts a flowchart of an example process of training an ML model using differently masked data from different data contributors in sMPC in accordance with an illustrative embodiment.

With reference to FIG. 4, this figure depicts a flowchart of an example process of training an ML model using differently masked data from different data contributors in sMPC in accordance with an illustrative embodiment. Process 400 can be implemented using a combination of applications 302 and 342 from FIG. 3. The operations of process 400 are depicted and described with respect to a single data contributor only for the clarity of the description. Certain operations of process 400 are repeated with respect to each data contributor when multiple data contributors participate in sMPC, as has been described herein.

An embodiment receives masked data from a data contributor (block 402). The embodiment causes a super mask to be generated (block 404). The embodiment causes an encrypted mask of a data contributor to be decrypted (block 406). The operations of blocks 404 and 406 result in the computation of a multiplication factor as described herein.

The embodiment receives a multiplication factor for a data contributor (block 408). The embodiment generates, or causes the generation of, the transformation value as described herein (block 410). The embodiment computes a scale factor for the data contributor (block 412). The embodiment generates scale factors for each participating data contributor in this manner. The embodiment stores various data contributors' scale factors along with a suitable identifying information of the corresponding data contributor (block 414).

For a participating data contributor, the embodiment transforms the data contributor's masked data using the scale factor of the data contributor (block 416). The embodiment performs similar transformations for the masked data of all participating data contributors. The embodiment creates a union of all transformed masked data of all participating data contributors (block 418).

The embodiment supplies the union data for training a selected ML model that can be used for making predictions in the sMPC scenario (block 420). The embodiment causes the training of the ML model using the union data and receives the trained ML model (block 422). The embodiment stores the trained ML model for making predictions when the same set or subset of data contributors participate in the sMPC with new masked data (block 424). The embodiment ends process 400 thereafter.

Figure 5:
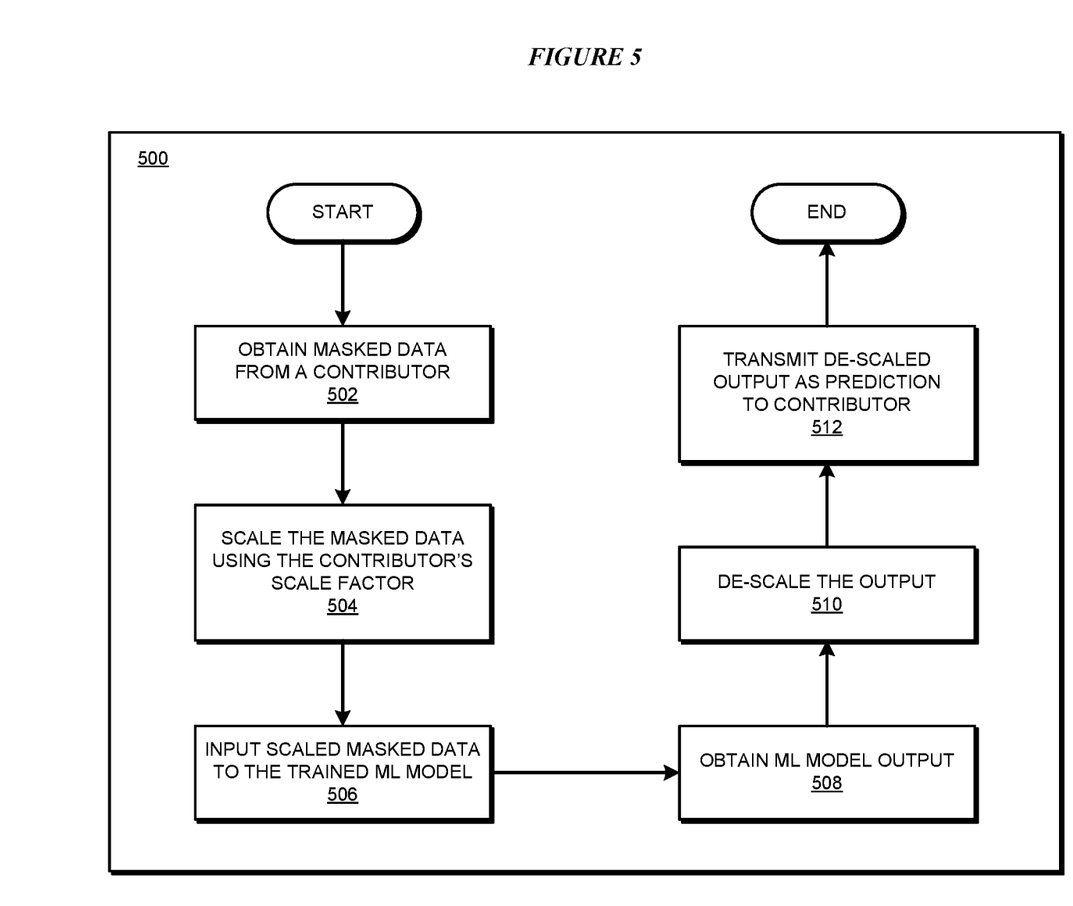
FIG. 5 depicts a flowchart of an example process of making predictions in sMPC using an ML model with differently masked data from different data contributors in accordance with an illustrative embodiment.

With reference to FIG. 5, this figure depicts a flowchart of an example process of making predictions in sMPC using an ML model with differently masked data from different data contributors in accordance with an illustrative embodiment. Process 500 can be implemented using application 302 from FIG. 3.

An embodiment receives masked data from a data contributor (block 502). The embodiment scales the masked data using the data contributor's saved scale factor (block 504). The embodiment inputs the scaled masked data into the trained ML model saved at block 424 in FIG. 4(block 506). The embodiment obtains an output from the trained ML model (block 508). The embodiment de-scales the output (block 510). The embodiment transmits the de-scaled output to the data contributor as the prediction (block 512). The embodiment ends process 500 thereafter.

Thus, a computer implemented method, system or apparatus, and computer program product are provided in the illustrative embodiments for machine learning with differently masked data in secure multi-party computing and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
receiving a set of encrypted mask values corresponding to a set of data contributors, wherein a first data contributor in the set of data contributors uses an encrypted version of a corresponding first encrypted mask value from the set of encrypted mask values to obfuscate first data of the first data contributor, the set of encrypted mask values encrypted using a public key;
constructing, in a secure multi-party computation (sMPC) system, a super mask comprising a polynomial, the polynomial comprising decryptions of the set of encrypted mask values, each decryption of an encrypted mask value in the set of encrypted mask values multiplied by a pseudo-random value, each decryption performed using a private key corresponding to the public key;
applying, using a processor and a memory, to form a first scaled masked data, a first scale factor to first masked data of the first data contributor, the scale factor being computed specifically for the first data contributor by dividing the super mask by a decryption of the first mask value;
constructing a union of all scaled masked data from all data contributors in the set of data contributors, the union including the first scaled masked data of the first data contributor; and
training a machine learning (ML) model using the union as training data, wherein the union continues to keep obfuscated differently masked data from different data contributors, the training resulting in a trained ML model usable in the sMPC with the set of data contributors.

2. The method of claim 1, further comprising:
receiving new masked data from the first data contributor;
scaling the new masked data using the first scale factor;
inputting the scaled new masked data into the trained ML model;
de-scaling an output of the trained ML model using the first scale factor; and
transmitting to the first data contributor the de-scaled output as a prediction based on the new masked data.

3. The method of claim 2, wherein subjecting the prediction to a reverse of a masking operation using a first mask of the first data contributor produces an actual predicted value.

4. The method of claim 1, wherein the first data contributor uses the unencrypted version of the corresponding first encrypted mask value from the set of encrypted mask values to obfuscate only a portion of original data of the first data contributor and form the first masked data.

5. A computer usable program product comprising a non-transitory computer readable storage medium, and program instructions stored on the storage medium, the stored program instructions when executed by a processor causing operations comprising:
receiving a set of encrypted mask values corresponding to a set of data contributors, wherein a first data contributor in the set of data contributors uses an unencrypted version of a corresponding first encrypted mask value from the set of encrypted mask values to obfuscate first data of the first data contributor, the set of encrypted mask values encrypted using a public key;
constructing, in a secure multi-party computation (sMPC) system, a super mask comprising a polynomial, the polynomial comprising decryptions of the set of encrypted mask values, each decryption of an encrypted mask value in the set of encrypted mask values multiplied by a pseudo-random value, each decryption performed using a private key corresponding to the public key;
applying, using a processor and a memory, to form a first scaled masked data, a first scale factor to first masked data of the first data contributor, the scale factor being computed specifically for the first data contributor by dividing the super mask by a decryption of the first mask value;
constructing a union of all scaled masked data from all data contributors in the set of data contributors, the union including the first scaled masked data of the first data contributor; and
training a machine learning (ML) model using the union as training data, wherein the union continues to keep obfuscated differently masked data from different data contributors, the training resulting in a trained ML model usable in the sMPC system with the set of data contributors.

6. The computer usable program product of claim 5, the stored program instructions when executed by a processor causing operations further comprising:
receiving new masked data from the first data contributor;
scaling the new masked data using the first scale factor;
inputting the scaled new masked data into the trained ML model;
de-scaling an output of the trained ML model using the first scale factor; and
transmitting to the first data contributor the de-scaled output as a prediction based on the new masked data.

7. The computer usable program product of claim 6, wherein subjecting the prediction to a reverse of a masking operation using a first mask of the first data contributor produces an actual predicted value.

8. The computer usable program product of claim 5, wherein the first data contributor uses the encrypted version of the corresponding first encrypted mask value from the set of encrypted mask values to obfuscate only a portion of original data of the first data contributor and form the first masked data.

9. The computer usable program product of claim 5, wherein the stored program instructions in the computer readable storage medium in a local data processing system, and wherein the stored program instructions are transferred over a network from a remote data processing system.

10. The computer usable program product of claim 5, wherein the stored program instructions are stored in the computer readable storage medium in a server data processing system, and wherein the stored program instructions are downloaded over a network to a remote data processing system for use in a computer readable storage device associated with the remote data processing system.

11. A computer system comprising a processor, a computer-readable memory, and a non-transitory computer readable storage medium, and program instructions stored on the storage medium for execution by the processor via the memory, the stored program instructions comprising:

program instructions to receive a set of encrypted mask values corresponding to a set of data contributors, wherein a first data contributor in the set of data contributor uses an encrypted version of a corresponding first encrypted mask value from the set of encrypted mask values to obfuscate first data of the first data contributor, the set of encrypted mask values encrypted using a public key;

program instructions to construct, in a secure multi-party computation (sMPC) system, a super mask comprising a polynomial, the polynomial comprising decryptions of the set of encrypted mask values, each decryption of an encrypted mask value in the set of encrypted mask values multiplied by a pseudo-random value, each decryption performed using a private key corresponding to the public key;

program instructions to apply, using a processor and a memory, to form a first scaled masked data, a first scale factor to first masked data of the first data contributor, the scale factor being computed specifically for the first data contributor by dividing the super mask by a decryption of the first mask value;

program instructions to construct a union of all scaled masked data from all data contributors in the set of data contributors, the union including the first scaled masked data of the first data contributor; and program instructions to train a machine learning (ML) model using the union as training data, wherein the union continues to keep obfuscated differently masked data from different data contributors, the training resulting in a trained ML model usable in the sMPC system with the set of data contributors.

* * * * *